US006822051B2

(12) United States Patent
Harris

(10) Patent No.: US 6,822,051 B2
(45) Date of Patent: Nov. 23, 2004

(54) HIGH DENSITY POLYETHYLENE MELT BLENDS FOR IMPROVED STRESS CRACK RESISTANCE IN PIPE

(75) Inventor: Michael G. Harris, Findlay, OH (US)

(73) Assignee: Media Plus, Inc., Findlay, OH (US)

( * ) Notice: Subject to any disclaimer, the term of this patent is extended or adjusted under 35 U.S.C. 154(b) by 272 days.

(21) Appl. No.: 10/112,200

(22) Filed: Mar. 29, 2002

(65) Prior Publication Data

US 2003/0187083 A1 Oct. 2, 2003

(51) Int. Cl.$^7$ .................... C08L 23/00; C08L 23/04; C08F 255/02; B29D 22/00; B29D 23/00
(52) U.S. Cl. ............... 525/240; 428/35.7; 428/36.9; 428/36.92; 525/324
(58) Field of Search ................ 428/36.9, 36.92, 428/35.7; 525/240, 324

(56) References Cited

U.S. PATENT DOCUMENTS

| | | | |
|---|---|---|---|
| 3,176,052 A | 3/1965 | Peticolas | 260/897 |
| 3,231,636 A | 1/1966 | Snyder et al. | 260/897 |
| 3,261,889 A | 7/1966 | van't Wout | 260/897 |

(List continued on next page.)

FOREIGN PATENT DOCUMENTS

| | | |
|---|---|---|
| CA | 1106099 | 7/1981 |
| CA | 1106521 | 8/1981 |
| CA | 124948 | 6/1982 |
| CA | 2070470 | 12/1992 |
| DE | 0126977 | 8/1977 |
| DE | 2943380 | 5/1980 |
| DE | 0268963 | 6/1989 |
| DE | 19945980 | 3/2001 |
| EP | 0129312 | 12/1984 |
| EP | 0134427 | 3/1985 |
| EP | 0273284 | 7/1988 |
| EP | 0310051 | 4/1989 |
| EP | 0339990 | 11/1989 |
| EP | 0707040 | 4/1991 |
| EP | 0517222 | 12/1992 |
| EP | 0533154 | 3/1993 |
| EP | 0545181 | 6/1993 |
| EP | 1146070 | 10/2001 |
| FR | 2405961 | 5/1979 |
| GB | 0815805 | 7/1956 |
| GB | 0829148 | 6/1957 |
| GB | 0843697 | 8/1960 |
| GB | 0860329 | 2/1961 |
| GB | 0944208 | 12/1963 |
| GB | 2007685 | 5/1979 |
| GB | 2028716 | 3/1980 |
| JP | 53125452 | 11/1978 |
| JP | 79100444 | 8/1979 |
| JP | 5582140 | 6/1980 |
| JP | 61043639 | 3/1986 |
| JP | 09241437 | 9/1997 |
| WO | 9117900 | 11/1991 |
| WO | 9119763 | 12/1991 |
| WO | 9313141 | 7/1993 |
| WO | 9315887 | 8/1993 |
| WO | 9422948 | 10/1994 |

OTHER PUBLICATIONS

Harris, Michael G. et al., U.S. patent application Ser. No. 10/022,706, filed Dec. 17, 2001.
Starita, Joseph M., U.S. patent application Ser. No. 10/017,314, filed Dec. 14, 2001.
Starita, Joseph M., U.S. patent application Ser. No. 10/194,136, filed Jul. 12, 2002.
Starita, Joseph M., U.S. patent application Ser. No. 10/337,084, filed Jan. 6, 2003.
Starita, Joseph M., U.S. patent application No. PCT/US03/08106, filed Mar. 18, 2003.
Equistar Chemicals, *The Chemistry of Polyethylene Insulation*, Sep. 2002, available at http://www.equistarchem.com/TechLit/Tech%20Topics/Equistar%20Industry%20Papers/Chemistry%20of%20PE%20Insulation.pdf.
Gibbs, M.L., "Evaluations of Post–Consumer Recycled High Density Polyethylene", Quantum Chemical Corporation (13 pgs.) [pre Feb. 1997].
Gibbs, M.L., "Post–consumer recycled HDPE evaluated" (2 pgs.) [pre Feb. 1997].
Gibbs, M.L., "Recycling– Post–Consumer Recycled HDPE: Suitable for Blowmolding?", Plastic Engineering, pp. 57–59 (Jul. 1990).
Package Manufacturing, "Resin contamination limits HDPE reuse", Packaging Digest, pp. 78, 81–82 (Jul. 1990).
Speed, C.S. et al., "Structure/ Property Relationships in Exxpol $^{198}$ Polymers", Society of Plastics Engineers Polyolefins VII International Conference, Houston, TX, Feb. 24–27 (1991).
Williams, T. et al., Polymer Letters, vol. 6, pp. 621–624 (1968).
"We're looking at flexible barrier Packaging in a whole new light", Curwood Advertisement, (2 pgs.) [pre feb. 1997].

*Primary Examiner*—Patrick D. Niland
(74) *Attorney, Agent, or Firm*—Jones Day

(57) ABSTRACT

The invention provides a polyethylene composition comprising a melt blend of (i) a bimodal high molecular weight high density polyethylene resin having a NCTL stress crack resistance of about 200 hours or greater, and (ii) a high density polyethylene resin selected from the group consisting of a homopolymer high density polyethylene resin, a copolymer high density polyethylene resin, and mixtures thereof, wherein the composition has a minimum NCTL stress crack resistance of 24 hours. In another embodiment, a polyethylene composition comprises a melt blend of the bimodal high molecular weight high density polyethylene resin and a linear low density polyethylene resin. The bimodal high molecular weight high density polyethylene resin can be a commodity film grade resin, the homopolymer and copolymer resins can be milk bottle grade and detergent bottle grade, respectively, and the linear low density polyethylene resin can be a film grade. The compositions are especially useful for manufacture of profile and corrugated pipe and/or pipe fitting applications, and chemical waste applications including sanitary sewer or irrigation piping systems.

46 Claims, 1 Drawing Sheet

U.S. PATENT DOCUMENTS

| | | | |
|---|---|---|---|
| 3,280,220 A | 10/1966 | Nelson | 265/897 |
| 3,795,633 A | 3/1974 | Golovoy et al. | 260/2.3 |
| 3,884,855 A | 5/1975 | Baumann et al. | 260/2.3 |
| 3,976,612 A | 8/1976 | Kaji et al. | 260/23 R |
| 3,998,914 A | 12/1976 | Lillis et al. | 260/897 |
| 4,076,698 A | 2/1978 | Anderson et al. | 526/348.6 |
| 4,115,499 A | 9/1978 | Salyer et al. | 264/122 |
| 4,303,710 A | 12/1981 | Bullard et al. | 428/35 |
| 4,330,639 A | 5/1982 | Matsuura et al. | 525/240 |
| 4,332,748 A | 6/1982 | Fremont | 264/11 |
| 4,346,834 A | 8/1982 | Mazumdar | 229/54 R |
| 4,374,227 A | 2/1983 | Michie, Jr. | 524/528 |
| 4,390,666 A | 6/1983 | Moriguchi et al. | 525/194 |
| 4,461,873 A | 7/1984 | Bailey et al. | 525/240 |
| 4,495,334 A | 1/1985 | Matsuura et al. | 525/240 |
| 4,536,550 A | 8/1985 | Moriguchi et al. | 525/240 |
| 4,547,551 A | 10/1985 | Bailey et al. | 525/240 |
| 4,550,143 A | 10/1985 | Tanaka et al. | 525/240 |
| 4,556,768 A | 12/1985 | Atsumi et al. | 200/302.2 |
| 4,567,069 A | 1/1986 | Jabarin | 428/35 |
| 4,577,768 A | 3/1986 | Go, deceased et al. | 215/1 C |
| 4,737,547 A | 4/1988 | White | 525/193 |
| 4,786,688 A | 11/1988 | Thiersault et al. | 525/240 |
| 4,812,504 A | 3/1989 | Su | 524/229 |
| 4,824,912 A | 4/1989 | Su | 525/240 |
| 4,835,219 A | 5/1989 | Tajima et al. | 525/240 |
| 4,911,985 A | 3/1990 | Jenkins et al. | 428/446 |
| 4,962,148 A | 10/1990 | Orikasa et al. | 524/504 |
| 5,028,663 A | 7/1991 | Chung | 525/198 |
| 5,030,662 A | 7/1991 | Banerjie | 521/43.5 |
| 5,066,542 A | 11/1991 | Tabor et al. | 428/461 |
| 5,071,686 A | 12/1991 | Genske et al. | 428/35.7 |
| 5,073,416 A | 12/1991 | Avakian et al. | 428/2 |
| 5,073,598 A | 12/1991 | Anzini | 525/193 |
| 5,102,955 A | 4/1992 | Calabro et al. | 525/240 |
| 5,153,039 A | 10/1992 | Porter et al. | 428/36.92 |
| 5,155,151 A | 10/1992 | Hashimoto et al. | 524/95 |
| 5,185,199 A | 2/1993 | Sawyer et al. | 428/288 |
| 5,189,106 A | 2/1993 | Morimoto et al. | 525/240 |
| 5,210,142 A | 5/1993 | Kale et al. | 525/240 |
| 5,254,617 A | 10/1993 | Inoue et al. | 524/433 |
| 5,278,232 A | 1/1994 | Seelert et al. | 525/71 |
| 5,338,589 A | 8/1994 | Böhm et al. | 428/36.9 |
| 5,382,630 A | 1/1995 | Stehling et al. | 525/240 |
| 5,418,272 A | 5/1995 | Kawabata et al. | 524/436 |
| 5,468,809 A | 11/1995 | Ghisellini et al. | 525/240 |
| 5,494,965 A | 2/1996 | Harlin et al. | 525/52 |
| 5,534,317 A | 7/1996 | Herman et al. | 428/35.7 |
| 5,534,572 A | 7/1996 | Taylor et al. | 524/275 |
| 5,552,198 A | 9/1996 | Hiltner et al. | 428/35.7 |
| 5,594,071 A | 1/1997 | Takahashi et al. | 525/240 |
| 5,601,891 A | 2/1997 | Herman et al. | 428/35.7 |
| 5,631,069 A | 5/1997 | Wooster et al. | 428/220 |
| 5,635,262 A | 6/1997 | Best et al. | 428/36.92 |
| 5,663,236 A | 9/1997 | Takahashi et al. | 525/240 |
| 5,693,391 A | 12/1997 | Herman et al. | 428/35.7 |
| 5,736,237 A | 4/1998 | Rhee et al. | 428/220 |
| 5,766,712 A | 6/1998 | Darr et al. | 428/36.91 |
| 5,783,637 A | 7/1998 | Herman et al. | 525/240 |
| 5,858,491 A | 1/1999 | Geussens et al. | 428/36.9 |
| 5,908,677 A | 6/1999 | Hiltner et al. | 428/35.7 |
| 5,908,679 A | 6/1999 | Berthold et al. | 428/36.9 |
| 5,959,006 A | 9/1999 | Pungtrakul | 524/1 |
| 5,981,664 A | 11/1999 | Neumann et al. | 525/240 |
| 6,063,871 A | 5/2000 | Kishine et al. | 525/240 |
| 6,090,893 A | 7/2000 | Harlin et al. | 525/240 |
| 6,156,845 A | 12/2000 | Saito et al. | 525/240 |
| 6,191,227 B1 | 2/2001 | Matsuoka et al. | 525/240 |
| 6,194,520 B1 | 2/2001 | Cheruvu et al. | |
| 6,204,349 B1 | 3/2001 | Shinohara et al. | 526/352.2 |
| 6,218,472 B1 | 4/2001 | Debras et al. | 525/191 |
| 6,265,055 B1 | 7/2001 | Simpson et al. | 428/213 |
| 6,649,698 B1 | 11/2003 | Mehta | 525/191 |

HIGH DENSITY POLYETHYLENE MELT BLENDS FOR IMPROVED STRESS CRACK RESISTANCE IN PIPE

BACKGROUND OF THE INVENTION

Profile and corrugated plastic pipe used in drainage, irrigation, storm sewer and sanitary sewer applications is produced from high density polyethylene (HDPE). A typical pipe composition comprises HDPE resin having a melt-flow index of about 0.15 to 0.4 blended with a small amount of carbon black for ultraviolet light protection. As used herein, the melt flow index is intended as an equivalent expression to the melt flow rate expressed as grams per 10 minutes at 190° C.

The Departments of Transportation (DOT) of many states of the United States require plastic pipe used for DOT projects to meet American Association of State Highway Transportation Officials (AASHTO) standards that include American Society of Testing Materials (ASTM) standards. Historically, corrugated pipe manufacturers used monomodal medium molecular weight (MMW)-HDPE to meet the required cell classifications in ASTM D-3350 for melt index, density, flexural modulus, tensile strength, bent strip environmental stress crack resistance (ESCR) and notched izod. The modality of the polymer (e.g., monomodal, bimodal, trimodal, and the like) relates to the number of peaks in a molecular weight distribution curve. In some cases, blends of virgin, recycled, reprocessed and/or scrap polyethylenes were used to achieve the required properties for specific cell classifications. Although these methods were effective for satisfactory short-term physical properties of the resulting pipe, in the longer term in the field the pipe had poor slow crack growth properties.

To address this problem, the AASHTO standards were recently modified to require a minimum stress crack resistance of 24 hours for corrugated and profile pipe as determined by the newly required Notched Constant Tensile Load (NCTL) test, and the previous ESCR test standard was eliminated. The replacement of the ESCR requirement by the NCTL requirement was done to ensure improved pipe performance related to long term stress cracking when the pipe is buried. However, it was found that, for the most part, the previous HDPE compositions did not meet the NCTL standard.

In response to this problem, specialty grade HDPE resins were developed by resin manufacturers. These resins have a narrow molecular weight distribution (MWD) and are produced by multistage polymerization resulting in a bimodal or multimodal HDPE that satisfies the NCTL standard and other AASHTO requirements for corrugated and profile pipe. However, these specialty resins are significantly more expensive than the standard grades typically used in the pipe manufacturing industry.

In an attempt to lower costs and still meet the required standards for HDPE pipe compositions, melt blends of lower priced commodity grades of HDPE were prepared in two- and three-material blend combinations and then tested for the cell classification properties. For example, monomodal high molecular weight (HMW)-HDPE copolymers, such as those used for blow-molded 55 gallon drums, were melt blended with monomodal MMW-HDPE copolymers, such as those used for blow-molded detergent bottles. However, the resulting HDPE blend had NCTL values that were less than 24 hours, although the melt index, density, notched izod, flexural modulus and tensile strength were within the AASHTO specifications. Therefore, this attempt was not successful in providing a viable substitute for the high cost specialty resins for profile and corrugated pipe applications.

In another attempt, three-material melt blends employing commodity linear low density polyethylene (LLDPE) resins, such as those used for drycleaning bags, in combination with commodity HMW-HDPE resins and/or homopolymer high density polyethylene (H-HDPE) resins, as described above, were prepared. The resulting composition met all of the AASHTO standards, including the NCTL standard. These melt blended compositions are the subject of co-owned, co-pending U.S. patent application Ser. No. 10/022,706.

In order to reduce costs and to accommodate manufacturing systems that are limited to producing two-material blends, there is an ongoing need to provide commodity resin combinations that result in melt blends that meet the AASHTO standards for profile and corrugated pipe.

SUMMARY OF THE INVENTION

The present invention provides HDPE two-material melt blend compositions for use in the manufacture of profile and corrugated pipe that meet all of the AASHTO standards, including the NCTL properties, and reduce or eliminate the necessity of using expensive specialty-grade HDPE resins.

An important component of the blends is a commodity film-grade bimodal HMW-HDPE resin that is commercially available for use in the manufacture of T-shirt bags, trash can liners and other heavy duty bags. It was unexpectedly discovered by independent testing of these resins by the inventor, that some of these bimodal HMW-HDPE resins inherently have a NCTL property of about 200 hours to as high as 1500 hours or greater. It was further unexpectedly discovered that combining a high NCTL film grade bimodal HMW-HDPE resin with either a commodity homopolymer MMW-HDPE resin, such as those used for milk, water or fruit juice bottles, or a commodity copolymer MMW-HDPE resin, such as those used for bleach or detergent bottles, produced a melt blended two-material HDPE composition that meets or exceeds all the AASHTO requirements for profile and corrugated pipe and pipe fittings. Moreover, the two-material blend combination results in a considerable cost saving over three-material blends and specialty multistage polymerized HDPE pipe resins. Each of the resins in the blends can independently be virgin, recycled, reprocessed or scrap resins.

Thus, in one embodiment, the invention provides a polyethylene composition comprising a melt blend of (i) a bimodal high molecular weight high density polyethylene resin having a NCTL stress crack resistance of about 200 hours or greater, and (ii) a high density polyethylene resin selected from the group consisting of a homopolymer high density polyethylene resin, a copolymer high density polyethylene resin, and mixtures thereof, wherein the composition has a minimum NCTL stress crack resistance of 24 hours.

In another embodiment, the invention provides an extruded, molded or formed plastic article comprising the composition, and in a further embodiment provides a pipe and/or pipe fitting comprising the composition wherein the bimodal high molecular weight high density polyethylene resin and the second high density polyethylene resin are present in the polyethylene composition in amounts relative to one another such that the composition has a density of about 0.940 to about 0.960 g/cm$^3$, preferably 0.945 to 0.955 g/cm$^3$, and a melt flow index of about 0.05 to about 1.0, preferably about 0.1 to 0.4. The pipe and/or pipe fitting preferably has a minimum flexural modulus of 110,000 psi and a minimum tensile strength of 3,000 psi.

In another embodiment, the invention provides a polyethylene composition comprising a melt blend of (i) a bimodal high molecular weight high density polyethylene resin having a NCTL stress crack resistance of about 200 hours or greater, and (ii) a linear low density polyethylene resin (LLDPE) wherein the composition has a minimum NCTL stress crack resistance of 24 hours. Preferably, the bimodal high molecular weight high density polyethylene resin and the linear low density polyethylene resin are present in the melt blended composition in amounts relative to one another such that the composition has a density of about 0.940 to about 0.960 g/cm$^3$, a melt flow index of about 0.1 to about 0.4. The LLDPE resin can be virgin, recycled, reprocessed and scrap resin, or mixtures of these.

The invention also provides an extruded, molded or formed plastic article comprising the HMW-HDPE and LLDPE composition.

The invention also provides methods for making the high density polyethylene compositions of the foregoing embodiments.

DETAILED DESCRIPTION OF THE INVENTION

Figure 1:
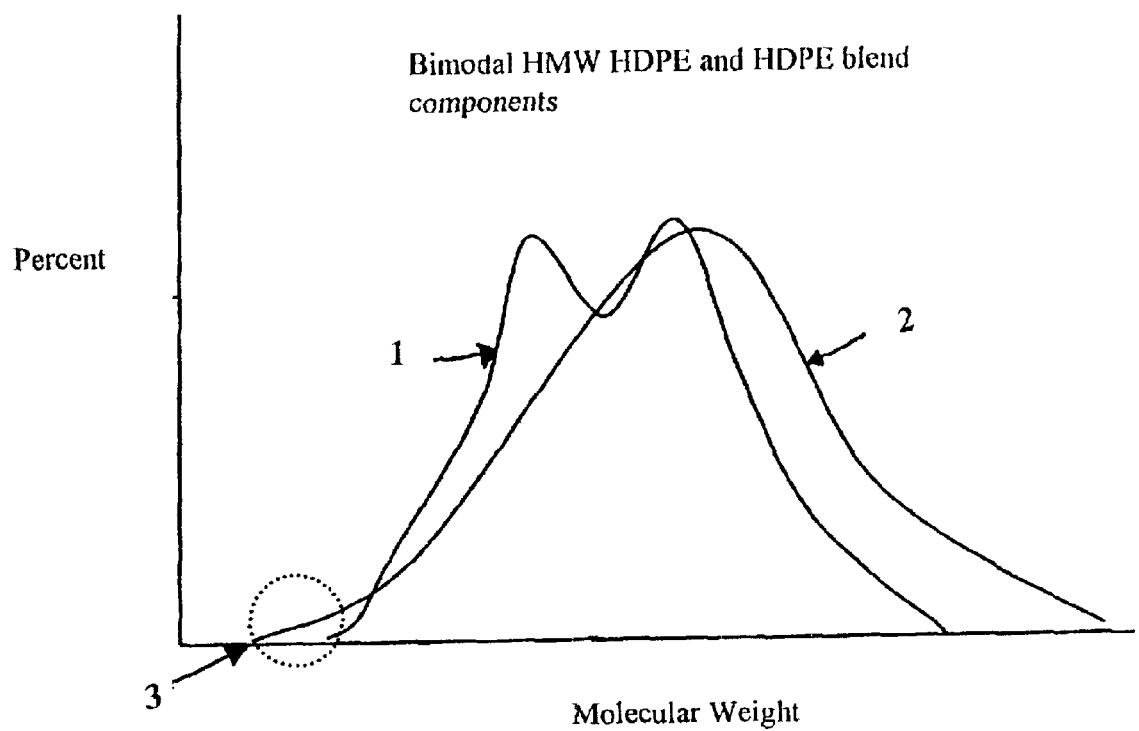
FIG. 1 illustrates a molecular weight distribution curve for a melt blend composition comprising a bimodal HMW-HDPE resin and a copolymer MMW-HDPE resin, according to an embodiment of the invention.

A polyethylene composition in accordance with the invention is a melt blend of high density polyethylene resins especially for use in the manufacture of pipe and pipe fittings, such as, but not limited to, those used for drainage, irrigation, storm sewer and sanitary sewer applications. The composition is particularly useful for extruded, vacuum molded and blow molded profile and corrugated pipe and pipe fittings. The composition is also useful in the manufacture of other extruded, injection molded, molded or formed plastic articles such as, but not limited to, smooth or corrugated conduit pipe for electrical, fiber-optic and telecommunication applications, wire and cable insulation materials, injection molded parts, extruded films and sheets (e.g., geomembranes and environmental films, such as those used for pond liners, landfill liners, and the like), environmental chambers, and the like, especially for applications in which good stress crack resistance is desired.

Current AASHTO standards for corrugated and profile HDPE pipe require the composition of the pipe to have the following properties: a minimum carbon black content of 2 percent by weight; a density of 0.945 to 0.955 grams per cubic centimeter (g/cm$^3$); a melt flow index (MFI) maximum of 0.4; a minimum flexural modulus of 110,000 pounds per square inch (psi); a minimum tensile strength of 3,000 psi; and a minimum stress crack resistance of 24 hours determined by the NCTL test. It is also recommended that the pipe has a minimum slow crack growth resistance of 24 hours determined by the Notched, Constant Ligament-Stress (NCLS) test.

As referred to herein, density, MFI, NCTL stress crack resistance and NCLS slow crack growth measurements are obtained according to ASTM D1505, ASTM D1238, ASTM D5397, and ASTM F 2136-01, respectively. Flexural modulus and tensile strength are measured according to ASTM D790 and ASTM D638, respectively.

In one embodiment of the invention, a polyethylene composition comprises a melt blend of (i) a bimodal high molecular weight high density polyethylene resin having a NCTL stress crack resistance of about 200 hours or greater, and (ii) a high density polyethylene resin selected from the group consisting of a homopolymer high density polyethylene resin, a copolymer high density polyethylene resin, and mixtures thereof, wherein the composition has a minimum NCTL stress crack resistance of 24 hours.

In another embodiment, a polyethylene composition in accordance with the invention comprises a melt blend of (i) a bimodal HMW-HDPE resin having a NCTL stress crack resistance of about 200 hours or greater, and (ii) a LLDPE resin, wherein the composition has a minimum NCTL stress crack resistance of 24 hours. Preferably, the bimodal HMW-HDPE resin has a NCTL stress crack resistance of about 300 hours to greater than about 1500 hours, more preferably about 500 hours to greater than about 1500 hours and, especially, about 800 hours to greater than about 1500 hours. This composition can be particularly useful in the chemical waste industry, especially in applications requiring very high stress crack resistance. For example, a composition comprising a bimodal HMW-HDPE resin having a NCTL stress crack resistance of, for example, 1300 hours, in combination with a LLDPE resin, can have a NCTL stress crack resistance of greater than 1000 hours.

The stress crack resistance of the resulting composition can be any desired value within the limits of the NCTL values of the individual components of the composition and the amounts of the components relative to each other. In order to achieve a composition having a desired stress crack resistance, it is necessary to measure the NCTL values for each of the components prior to their use in the composition. Once the NCTL values are known, the relative proportions of the ingredients to provide the desired stress crack resistance can be determined.

The bimodal HMW-HDPE resins suitable for use in the invention compositions can have a density of about 0.941 to about 0.958 g/cm$^3$, preferably about 0.945 to about 0.955 g/cm$^3$ and the melt flow index can be about 0.01 to about 0.2, preferably about 0.05 to about 0.15. The suitable HMW-HDPE resins have a NCTL stress crack resistance of 200 hours or greater. Preferably the resins have a NCTL stress crack resistance of about 300 hours to greater than about 1500 hours, more preferably about 500 hours to greater than about 1500 hours and, especially, about 800 hours to greater than about 1500 hours. Exemplary suitable bimodal HMW-HDPE resins include, but are not limited to, Equistar "L5005" (Equistar Chemicals, Houston, Tex.), Formosa "E905" (Formosa Plastics Corp., Livingston, N.J.) and Exxon "7760" (Exxon Mobil Chemical, Houston Tex.). For example, the inventor has tested the three foregoing resins and unexpectedly discovered that the NCTL values for each resin are greater than 1000 hours.

The bimodal HMW-HDPE resins suitable for use in the invention compositions are considered to be film-grade resins for applications such as T-shirt bags, trash can liners and heavy duty bags. The resins can be virgin resins or can be recycled, reprocessed or scrap resins that meet the NCTL test requirement of 200 hours or greater for use in the invention compositions.

The bimodal HMW-HDPE resins are usually polymerized using Nissan/Maruzen slurry technology, Nippon slurry technology or Mitsui slurry polymerization technology, as known to those skilled in the art of polymerization, where the reactors are operated in series configuration (cascaded)

and products with bimodal molecular weight distribution can be produced. The molecular weight distribution of a bimodal HMW-HDPE resin 1 as a component of an invention composition also containing a copolymer MMW-HDPE resin 2, is illustrated in FIG. 1. Conventional commodity MMW-HDPE has been unsatisfactory for use by itself for pipe applications because of its broad molecular weight distribution, which includes a low molecular weight tail 3 that contributes to failure of the NCTL test for stress crack resistance over a 24 hour period for this resin. The bimodal HMW-HDPE does not have the low molecular weight tail and its presence in the invention composition shifts the molecular weight distribution curve to a higher molecular weight, thus overcoming the effects of the low molecular weight tail, and resulting in a composition having a NCTL value of 24 hours or greater.

The Flow Rate Ratio (FRR), such as that defined in ASTM D1238 is a good indicator of the weight average molecular weight and a generally accepted test method for the polydispersity of polyethylene resin grades. Polydispersity is the ratio of the weight average molecular weight to the number average molecular weight, and the lower the polydispersity (and the FRR), the narrower is the MWD. The FRR is the ratio of the high load melt index (HLMI, condition F at 21.6 kg at 190° C.) to the melt index (MI, condition E at 2.16 kg and 190° C.). It is preferred that the FRR of the bimodal HMW-HDPE resins for use in the invention compositions is less than 200.

The homopolymer MMW-HDPE resins suitable for use in the invention compositions can have a density of about 0.957 to about 0.970 g/cm$^3$, preferably about 0.958 to about 0.965 g/cm$^3$ and a melt flow index of about 0.1 to about 1.5, preferably about 0.3 to about 1.0. Typical homopolymer MMW-HDPE resins suitable for use in the invention compositions are resins for applications such as water, dairy or fruit juice bottles. The resins can be virgin resins or can be recycled, reprocessed or scrap resins. The NCTL values for these resins are determined prior to using them as components in the invention compositions. The NCTL value for a commodity homopolymer MMW-HDPE resin is typically about 2 hours or less. These resins are usually identified by a generic number grade of "6007" designating "milk bottle" grade, as known to those skilled in the art. Virgin homopolymer MMW-HDPE resins suitable for use in the invention compositions are generally available from, for example, Equistar Chemical, Exxon Mobil Chemical, Chevron Phillips Chemical, Dow Chemical Company (Midland, Mich.), Ipiranga Quimica (Porto Alegre, Brazil), Samsung General Chemicals Co., Ltd. (Seosan, Korea), Sabic Plastic Products (Riyadh, Saudi Arabia) and the like.

Copolymer MMW-HDPE resins suitable for use in the invention compositions can have a density of about 0.941 to about 0.958 g/cm$^3$ and a melt flow index of about 0.01 to about 1.5. The copolymer HDPE comprises ethylene monomers and another monomer that can be propylene, butene, hexene, octene, metallocene, or the like, as is known to those skilled in the art. Typical copolymer MMW-HDPE resins are commercially available for applications such as detergent and bleach bottles. The resins can be virgin resins or can be recycled, reprocessed or scrap resins. The NCTL values for these resins are determined prior to using them as components in the invention compositions. The NCTL value for a commodity copolymer is less than 24 hours, typically about five to about ten hours. These resins are usually identified by a generic number grade of "5502" designating detergent bottle grade. Virgin copolymer MMW-HDPE resins suitable for use in the invention compositions are generally available from the same companies listed above for the homopolymer MMW-HDPE resins.

The LLDPE resins suitable for use in the invention compositions can have a melt flow index of about 0.03 to about 5.0, preferably about 0.1 to about 1.5, more preferably about 0.4 to about 1.0, and a density of 0.920 to about 0.940 g/cm$^3$, preferably about 0.925 to about 0.935 g/cm$^3$. Suitable LLDPE resins are commercially available for film applications such as dry cleaning (garment) bags. The resins can be virgin resins or can be recycled, reprocessed or scrap resins. The LLDPE resins are usually copolymers of polyethylene and hexene or butene but can contain small amounts of other resins such as octene, metallocene, or the like, as is known to those skilled in the art. The NCTL values for these resins are determined prior to using them as components in the invention compositions. The NCTL value for a commodity LLDPE copolymer is greater than 500 hours, typically about 800 to about 1500 hours. Virgin LLDPE copolymer resins suitable for use in the invention compositions are generally available from the same sources as listed above for the HDPE resins.

The amount of the bimodal HMW-HDPE resin in combination with the homopolymer MMW-HDPE resin and/or the copolymer MMW-HDPE resin, or the amount of the bimodal HMW-HDPE resin in combination with the LLDPE resin in the composition can vary depending on the NCTL values for each of the resins, as well as the desired density and melt flow index properties of the melt blended composition. The density and melt flow index values of the virgin resins are often provided by the manufacturer. Recycled films, reprocessed, reworked and scrap materials can be tested for density, melt index, tensile strength notched izod and NCTL values by known methods described above, and blended in the proper proportions to achieve the desired properties of the composition without undue experimentation, as known to those of ordinary skill in the art. In addition to altering the ratios of the ingredients to achieve specific physical properties of the composition, the ratios of the ingredients can be determined to achieve desirable processing characteristics, such as for a given extrusion process or a pipe profile design. For example, the melt flow index, which is a measure of the viscosity of the component, affects the processability of the melt blend. The lower the melt flow index, the higher the viscosity of the component. The melt flow index is a general indicator of the weight average molecular weight of the resins.

The FRR, described above, is also a good indicator of the processability at higher shear rates of the final melt blended compound. Therefore, an advantage of the methods of the invention, is that the FRR of a final composition can be predetermined by selecting resins having FRR values that will achieve desired processing and final product considerations, such as processability, melt strength, die swell ratio, forming, wall thickness, and the like. It is preferred that the final melt-blended composition have an FRR of about 80 to about 125, with about 90 to about 110 being more preferred. It has been found that melt-blended compositions with FRR greater than 150 risk failing the 24 hour stress crack resistance test (NCTL) and may be difficult to process into a molded article.

In general, the bimodal HMW-HDPE resin can be present in the composition in an amount of about 20% to about 90% and the homopolymer or copolymer HDPE can be present in an amount of about 10% to about 80%. For preferred processing and product performance, it may be desirable that the bimodal HMW-HDPE resin is present in an amount of about 40% to about 70% and the homopolymer or copolymer HDPE resin is correspondingly present in an amount of about 30% to about 60%. The bimodal HMW-HDPE resin can be present in an alternative composition in an amount of about 20% to about 90%, preferably about 50% to about 90%, and the LLDPE can be present in an amount of about 10% to about 80%, preferably about 10% to about 50%. Once in possession of the teachings herein, including the examples below of components which can be utilized to achieve the desired physical properties of the melt blend compositions, the selection of suitable components, not limited to those expressly disclosed, will be within the ordinary skill in the art. The invention practitioner will be able to adjust the components of the composition for specification and process variations without undue experimentation.

Preferably the bimodal HMW-HDPE and the homopolymer or copolymer MMW-HDPE are melt blended together, for example in an extruder or other mixer (e.g., Banbury, Henschel, and the like), in amounts relative to one another such that the resulting melt-blended, moldable or otherwise formable polyethylene composition has a density of about 0.940 to about 0.960 g/cm$^3$ and a melt flow index of about 0.1 to about 0.4. However, the density and melt flow index values may vary from these values, depending on the application for which the composition is specified. For pipe and/or pipe fittings, especially for profile and corrugated pipe or combinations of these, the composition preferably has a density of 0.945 to 0.955, a melt flow index of about 0.1 to 0.4 and, more preferably exhibits a minimum flexural modulus of 110,000 psi and a minimum tensile strength of 3,000 psi.

For applications such as chemical waste storage applications including sanitary sewer piping which benefit from compositions having a high stress crack resistance, the melt-blended composition comprising bimodal HMW-HDPE resin and LLDPE resin can have a density of about 0.950 or less.

Generally, a small diameter extruded pipe (e.g., about 2 inches to about 12 inches) is easier to extrude and form. Thus, a small diameter pipe, for example, can be formed from a melt blend composition of the invention having a melt flow index of about 0.3 to less than 0.4; whereas a large diameter extruded pipe (e.g., about 36 inches to about 72 inches) should be stiffer for extrusion and forming. Therefore a large diameter pipe can be formed from a melt blend composition having a melt flow index of about 0.15 to about 0.2, for example. Medium diameter pipes (e.g., about 15 inches to about 30 inches) can be formed from a melt blend composition having a moderate melt flow index of about 0.2 to about 0.3, for example.

Similarly, it is generally understood that the processability of corrugated pipe is improved by an increased stiffness or molecular weight of the melt blend, in comparison to the stiffness or molecular weight of the melt blend used to produce profile pipe. Accordingly, one of ordinary skill in the art could produce pipe according to the invention by varying the proportions of the melt blend components in the melt blend until the desired melt flow index and density of the composition was achieved, without undue experimentation.

Natural ethylene polymers have a detrimental property in that they slowly degrade in the presence of oxygen (air), and the degradation is known to be accelerated by the presence of heat and/or ultraviolet radiation. Preferably, pipes or pipe fittings comprising the melt blended composition are compounded with small amounts of carbon black, or other photo- and thermal-oxidation retarders to minimize the effects of heat and ultra violet light. For example, the composition can comprise carbon black (about 1 percent to about 5 percent, preferably about 2 percent to about 3 percent by weight). The carbon blacks can include any of the commonly available, commercially-produced carbon blacks including, but not limited to, furnace blacks, acetylene blacks, channel blacks and lamp blacks.

The compositions according to the invention may also comprise other additives customary for use in resin-based compositions, according to the application for which they are being used. Such additives include, but are not limited to, antioxidants, antiozonants, lubricants, stabilizers, processing aids, water-proofing fillers, inorganic fillers, colorants, curatives, and the like. These additives are used in amounts designed to provide their intended effect in the resulting composition. The total amount of such additives can range from zero to about 10 percent by weight based on the total weight of the composition.

A method for producing a HDPE composition according to the invention comprises the steps of melt blending together a sufficient amount of (i) a bimodal high molecular weight high density polyethylene resin having a NCTL stress crack resistance of about 200 hours or greater, and a sufficient amount of (ii) a high density polyethylene resin selected from the group consisting of a homopolymer high density polyethylene resin, a copolymer high density polyethylene resin, and mixtures thereof, to produce a polyethylene composition having a NCTL stress crack resistance of at least 24 hours.

In another embodiment, a method for producing a polyethylene composition according to the invention comprises the steps of melt blending together a sufficient amount of (i) a bimodal high molecular weight high density polyethylene resin having a NCTL stress crack resistance of about 200 hours or greater, and a sufficient amount of (ii) a linear low density polyethylene resin, to produce a polyethylene composition having a NCTL stress crack resistance of at least 24 hours.

The bimodal HMW-HDPE, homopolymer and copolymer MMW-HDPE resins and LLDPE resins can be in pellet, powdered, flake or regrind form, or the like. The methods are not intended to be limited to any one method of melt blending the components. For example, mixing or melt blending of components, including any additives if used, can be by batch compounding, such as in a Banbury or Henschel type mixer, or can be continuous compounding in an extruder. For example, in one embodiment of the method, the components of the composition can be dry-blended prior to melt blending by single screw or twin screw extrusion. In another embodiment, the dry components can be separately fed through separate ports into an extruder for melt blending. In yet another embodiment, the two or more components can be pre-combined in a mixer, such as a Banbury or Henschel mixer, preferably under high intensity blending, to form a hot melt which then can be combined with a third component (e.g., a let down resin) in an extruder. For example, a sufficient amount of bimodal HMW-HDPE can be preblended in a Banbury mixer with less than the required amount of the copolymer MMW-HDPE, and the resulting composition blended with the remaining amount of copolymer MMW-HDPE in an extruder to produce the desired percentages of each of the components in the final composition. Moreover, any of the components can be mixed with, for example, carbon black or other colorants and/or other additives, as a master batch, which is then added to a let down resin comprising one or more of the remaining components, to produce the desired percentages of the components in the final composition. As a non-limiting example, 25% of a master batch composition comprising 90% bimodal HMW-HDPE and 10% carbon black can be combined with 75% copolymer MMW-HDPE let down resin to provide the desired amount of the resins and carbon black in the final composition to provide the desired properties of density and melt flow index. The temperatures and other variables required for dry blending, hot melts, and melt blending are well known to those skilled in the art.

Following melt blending of the components, the composition can be injection molded, blow molded, rolled, milled, sheet extruded, film extruded, pipe extruded, or formed or fabricated in any manner whatsoever to form the desired product by known methods. Once the teachings herein are in hand, the skilled practitioner of this invention will be able to adapt conventional methods of forming material, such as injection molding and other techniques mentioned above, to the production of desired articles of manufacture using the polyethylene composition of the invention. This adaptation can be implemented on an empirical basis, without undue experimentation.

EXAMPLES

The following examples illustrate methods of preparation of melt blended polyethylene compositions of the invention. In each of the examples, the compositions were prepared under industry standard conditions using melt blending techniques as known in the art. However, the examples are not intended to be limiting, as other methods for preparing these compounds and different compounding formulations may be determined by those skilled in the art. Further, the blend components are not limited to the specific polyethylenes shown. Thus, it is believed that any of the variables disclosed herein can readily be determined and controlled without departing from the scope of the invention herein disclosed and described.

Example 1

A commodity bimodal HMW-HDPE resin (Equistar "L5005") having a NCTL of greater than 1360 hours was melt blended in a 50:50 ratio with a commodity homopolymer MMW-HDPE (Chevron Phillips Chemical "6007") having a NCTL of 2.1 hours. The bimodal HMW-HDPE had the following properties: MI=0.08, density=0.949 g/cm$^3$ and notched izod=4.0. The homopolymer MMW-HDPE had the following properties: MI=0.70, Density=0.964, notched izod=3.0. Dry mixtures of the pelletized HDPE ingredients were introduced directly into a profile extruder to produce HDPE pipe. The properties of the resulting high density polyethylene composition are illustrated in Table 1.

The composition exhibited properties that meet all the AASHTO specifications for profile and corrugated pipe. In particular, the NCTL property was a desirable 40 hours.

Example 2

The bimodal HMW-HDPE employed in Example 1 was melt blended in a ratio of 35:65 with a copolymer MMW-HDPE (Equistar "5502", Lot LR734) having a NCTL=8.0 hours, by the method described in Example 1. The copolymer MMW-HDPE had the following properties: MI=0.35, density=0.954 and notched izod=3.0. The properties of the resulting high density polyethylene composition are illustrated in Table 1.

This composition also exhibited properties that meet all the AASHTO specifications for profile and corrugated pipe. In this example, the NCTL property of the composition was a desirable 30 hours.

Example 3

The bimodal HMW-HDPE employed in Examples 1 and 2 was melt blended in a ratio of 80:20 with a LLDPE having a NCTL of 1500 hours, by the method described in Example 1. The LLPDE had the following properties: MI=0.50, density=0.925, notched izod=15. The properties of the resulting polyethylene composition are illustrated in Table 1.

This composition exhibits a very high NCTL property which makes it suitable for chemical waste applications, and sanitary sewer and irrigation piping systems.

TABLE 1

Physical properties of the melt-blended polyethylene compositions

| Property | Units | Test Method (ASTM) | Example 1 | Example 2 | Example 3 |
| --- | --- | --- | --- | --- | --- |
| Density | g/cm$^3$ | D1505 | 0.954 | 0.952 | 0.944 |
| MFR(190° C.) | g/10 min | D1238 | 0.2 | 0.2 | 0.12 |
| HLMI | g/10 min | D1238 | 25 | 18 | 12 |
| NCTL | hours | D5397 | 40 hours | 30 hours | 1300 hours |
| Tensile Strength | psi | D638 | 4,000 | 3,600 | 3,400 |
| Flexural Modulus | psi | D790 | 195,000 | 185,000 | 150,000 |
| Notched Izod | ft-lb/in | D256 | 3.0 | 4.0 | 5.0 |
| Cell Classification | n/a | D3350 | 335400 | 335400 | 335400 |
| Flow Rate Ratio | n/a | D1238 | 125 | 90 | 100 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

I claim:

1. A polyethylene composition comprising a melt blend of (i) a bimodal high molecular weight high density polyethylene resin having a NCTL stress crack resistance of about 200 hours or greater, and (ii) a high density polyethylene resin selected from the group consisting of a homopolymer high density polyethylene resin, a copolymer high density polyethylene resin, and mixtures thereof, wherein the composition has a minimum NCTL stress crack resistance of 24 hours.

2. The composition of claim 1, wherein the bimodal high molecular weight high density polyethylene resin is a film grade resin.

3. The composition of claim 2, wherein the bimodal high molecular weight high density polyethylene resin is a T-shirt film grade resin.

4. The composition of claim 1, wherein the bimodal high molecular weight high density polyethylene resin is a virgin resin.

5. The composition of claim 1, wherein the bimodal high molecular weight high density polyethylene resin has a NCTL stress crack resistance of about 300 hours to greater than about 1500 hours.

6. The composition of claim 5, wherein the NCTL stress crack resistance is about 500 hours to greater than about 1500 hours.

7. The composition of claim 6, wherein the NCTL stress crack resistance is about 800 hours to greater than about 1500 hours.

8. The composition of claim 1, wherein the homopolymer high density polyethylene resin is a medium molecular weight resin.

9. The composition of claim 1, wherein the homopolymer high density polyethylene resin is a milk bottle grade resin.

10. The composition of claim 1, wherein the copolymer high density polyethylene resin is a medium molecular weight resin.

11. The composition of claim 1, wherein the copolymer high density polyethylene resin is a detergent bottle grade resin.

12. The composition of claim 1, wherein each of the resins is independently selected from the group consisting of virgin, recycled, reprocessed and scrap resins, and mixtures thereof.

13. The composition of claim 1, wherein the bimodal high molecular weight high density polyethylene resin and the second high density polyethylene resin are present in the melt blended composition in amounts relative to one another such that the composition has a density of about 0.945 to about 0.955 g/cm$^3$, a melt flow index of about 0.1 to about 0.4.

14. A plastic article produced by the process of extruding, molding or forming the high density polyethylene composition of claim 1.

15. The plastic article of claim 14, wherein the plastic article is a pipe or a pipe fitting.

16. The plastic article of claim 15, wherein the pipe is selected from the group consisting of profile pipe, corrugated pipe, and combinations thereof.

17. An extruded, molded or formed pipe and/or pipe fitting comprising a polyethylene composition that comprises a melt blend of (i) a bimodal high molecular weight high density polyethylene resin having a NCTL stress crack resistance of about 200 hours or greater, and (ii) a high density polyethylene resin selected from the group consisting of a homopolymer high density polyethylene resin, a copolymer high density polyethylene resin, and mixtures thereof, wherein the composition has a minimum NCTL stress crack resistance of 24 hours.

18. The pipe and/or pipe fitting of claim 17, wherein the bimodal high molecular weight high density polyethylene resin and the second high density polyethylene resin are present in the polyethylene composition in amounts relative to one another such that the composition has a density of about 0.945 to about 0.955 g/cm$^3$ and a melt flow index of about 0.1 to about 0.4.

19. The pipe and/or pipe fitting of claim 17, wherein the bimodal high molecular weight high density polyethylene resin and the second high density polyethylene resin are present in the polyethylene composition in amounts relative to one another such that the composition has a density of 0.945 to 0.955 g/cm$^3$, a melt flow index of about 0.1 to 0.4, a minimum flexural modulus of 110,000 psi and a minimum tensile strength of 3,000 psi.

20. The pipe and/or pipe fitting of claim 17, wherein the pipe is selected from the group consisting of profile pipe, corrugated pipe, and combinations thereof.

21. The pipe and/or pipe fitting of claim 17, wherein each of the resins is independently selected from the group consisting of virgin, recycled, reprocessed and scrap resins, and mixtures thereof.

22. A method for producing a high density polyethylene composition, comprising the steps of melt blending together a sufficient amount of (i) a bimodal high molecular weight high density polyethylene resin having a NCTL stress crack resistance of about 200 hours or greater, and a sufficient amount of (ii) a high density polyethylene resin selected from the group consisting of a homopolymer high density polyethylene resin, a copolymer high density polyethylene resin, and mixtures thereof, to produce a polyethylene composition having a NCTL stress crack resistance of at least 24 hours.

23. The method of claim 22, wherein the high density polyethylene composition has a density of about 0.945 to about 0.955 g/cm$^3$, a melt flow index of about 0.1 to about 0.4.

24. The method of claim 22, wherein the bimodal high molecular weight high density polyethylene resin is a film grade resin.

25. The method of claim 22, wherein the bimodal high molecular weight high density polyethylene resin is a T-shirt film grade resin.

26. The method of claim 22, wherein the bimodal high molecular weight high density polyethylene resin is a virgin resin.

27. The method of claim 22, wherein the bimodal high molecular weight high density polyethylene resin has a NCTL stress crack resistance of about 300 hours to greater than about 1500 hours.

28. The method of claim 27, wherein the NCTL stress crack resistance is about 500 hours to greater than about 1500 hours.

29. The method of claim 28, wherein the NCTL stress crack resistance is about 800 hours to greater than about 1500 hours.

30. The method of claim 22, wherein the homopolymer high density polyethylene resin is a medium molecular weight resin.

31. The method of claim 22, wherein the homopolymer high density polyethylene resin is a milk bottle grade resin.

32. The method of claim 22, wherein the copolymer high density polyethylene resin is a medium molecular weight resin.

33. The method of claim 22, wherein the copolymer high density polyethylene resin is a detergent bottle grade resin.

34. The method of claim 22, wherein each of the resins is independently selected from the group consisting of virgin, recycled, reprocessed and scrap resins, and mixtures thereof.

35. A polyethylene composition comprising a melt blend of (i) a bimodal high molecular weight high density polyethylene resin having a NCTL stress crack resistance of about 200 hours or greater, and (ii) a linear low density polyethylene resin, wherein the composition has a minimum NCTL stress crack resistance of 24 hours.

36. The composition of claim 35, wherein the bimodal high molecular weight high density polyethylene resin and the linear low density polyethylene resin are present in the melt blended composition in amounts relative to one another such that the composition has a density of about 0.940 to about 0.960 g/cm$^3$, a melt flow index of about 0.1 to about 0.4.

37. The composition of claim 35, wherein the bimodal high molecular weight high density polyethylene resin has a NCTL stress crack resistance of about 300 hours to greater than about 1500 hours.

38. The composition of claim 37, wherein the NCTL stress crack resistance is about 500 hours to greater than about 1500 hours.

39. The composition of claim 38, wherein the NCTL stress crack resistance is about 800 hours to greater than about 1500 hours.

40. The composition of claim 35, wherein the bimodal high molecular weight high density polyethylene resin is a film grade resin.

41. The composition of claim 40, wherein the bimodal high molecular weight high density polyethylene resin is a T-shirt film grade resin.

42. The composition of claim 35, wherein each of the resins is independently selected from the group consisting of virgin, recycled, reprocessed and scrap resins, and mixtures thereof.

43. A plastic article produced by the process of extruding, molding or forming the high density polyethylene composition of claim 35.

44. A method for producing a high density polyethylene composition, comprising the steps of melt blending together a sufficient amount of (i) a bimodal high molecular weight high density polyethylene resin having a NCTL stress crack resistance of about 200 hours or greater, and a sufficient amount of (ii) a linear low density polyethylene resin, to produce a polyethylene composition having a NCTL stress crack resistance of at least 24 hours.

45. A polyethylene composition comprising a melt blend of (i) about 40% to about 70% bimodal high molecular weight high density polyethylene resin having a NCTL stress crack resistance of about 200 hours or greater, and (ii) about 30% to about 60% high density polyethylene resin selected from the group consisting of a homopolymer high density polyethylene resin, a copolymer high density polyethylene resin, and mixtures thereof, wherein the composition has a minimum NCTL stress crack resistance of 24 hours.

46. A polyethylene composition comprising a melt blend of (i) a bimodal high molecular weight high density polyethylene resin having a NCTL stress crack resistance of about 200 hours or greater, arid (ii) a linear low density polyethylene resin, wherein the composition has a density between 0.945 and 0.955 g/cm$^3$ and a minimum NCTL stress crack resistance of 24 hours.

* * * * *

UNITED STATES PATENT AND TRADEMARK OFFICE
CERTIFICATE OF CORRECTION

PATENT NO. : 6,822,051 B2
DATED : November 23, 2004
INVENTOR(S) : Harris

It is certified that error appears in the above-identified patent and that said Letters Patent is hereby corrected as shown below:

Column 14,
Line 25, delete "arid" and insert -- and --.

Signed and Sealed this

Twenty-second Day of March, 2005

JON W. DUDAS
*Director of the United States Patent and Trademark Office*